Nov. 5, 1940.  W. L. MARTIN  2,220,166

METHOD OF MAKING SHEARING PLATES

Filed Feb. 25, 1939

INVENTOR
WENDELL L. MARTIN
BY
ATTORNEY

Patented Nov. 5, 1940

2,220,166

UNITED STATES PATENT OFFICE 2,220,166

METHOD OF MAKING SHEARING PLATES

Wendell L. Martin, Shaker Heights, Ohio, assignor to The Martin Brothers Electric Company, Cleveland, Ohio, a corporation of Ohio Application February 25, 1939, Serial No. 258,533

6 Claims. (Cl. 76—104)

This invention relates to an improved method of manufacturing heads or shearing plates for electric razors or the like.

One object of this invention is to produce a simple and efficient method of manufacturing shearing plates for electric razors resulting in strong, durable and comparatively inexpensive plates operable in a very satisfactory manner.

Another object of this invention deals with improvements in the manufacture of such shearing plates made of several sections mounted side by side and forming together a shearing plate assembly capable of performing the work in a highly efficient manner.

In the drawing wherein similar character of reference designates corresponding parts throughout the several views:

Fig. 7 is a top plan view of a partly finished section of the shearing plate, while

Fig. 9 is a fragmental sectional view of a finished section of the shearing plate corresponding to Fig. 5, while Fig. 10 is a similar view corresponding to Fig. 6.

Fig. 12 is a side view of the plate shown in Fig. 11, while

Figure 1:
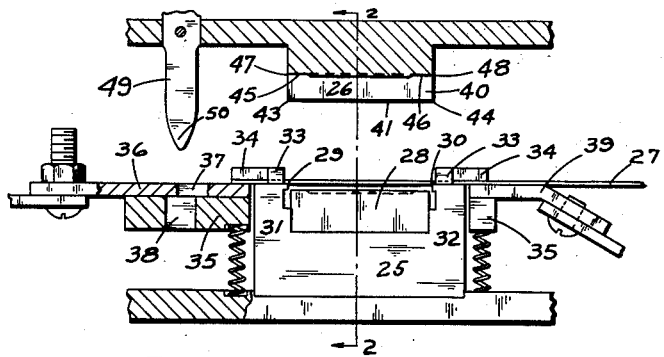
Fig. 1 is a front elevational view of the co-operating die members used in the manufacture of one section of the improved shearing plate.
Figure 2:
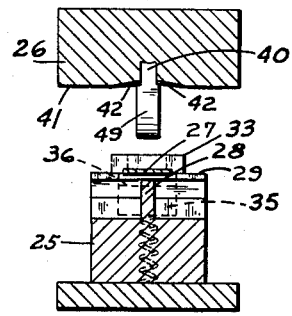
Fig. 2 is a cross sectional view taken in a plane indicated by line 2—2 in Fig. 1.

The hereinafter described method of manufacturing shearing plates, deals with the forming of several sections subsequently united or mounted side by side to form a shearing plate assembly. 15 represents one of such sections which is substantially channel-shape and includes two parallel side walls 16 and 17 united by a cross wall 18. The junctures of the side walls with the cross wall are preferably rounded as at 19, while the upper surface of the wall 18 is formed a concaved portion 20 of an arc drawn tangent to the rounded corners 19, which concaved portion falls short of the longitudinal ends of the section to provide two flat end surfaces 21 and 22. The concaved portion 20 of the section 15 forms a convexed underside or inner surface 23 united to the inner surfaces of the side walls 16 and 17 by small semicircular recesses 24. In practice, the length of section 15 is about one and one quarter inches while its height is about one eighth of an inch, it being understoood however that these dimensions may be changed to any desired extent without departing from the scope of the invention.

The blank section above described lends itself to manufacture at low cost in a single operation. As illustrated herein, the method comprises feeding between dies 25 and 26 a strip 27 of thin metal of adequate width. In practice, the lower die 25 includes a forming block 28 of a shape corresponding to the internal configuration of the section 15, and two laterally extending cutting edges 29 and 30 adequately located with respect to the upper wall of the block 28, which cutting edges are formed on two side blocks 31 and 32 between which is mounted the forming block 28. On the side blocks are provided guides 33 through which the strip 27 is free to slide during feeding operation, each guide extending longitudinally beyond its respective supporting side block to form an upper jaw 34 cooperating with a spring pressed lower jaw 35 for clamping the strip 27 in position preparatory to the forming of the blank section 15. One of the jaws 35, preferably the one remote from the strip entrance end of the die, carries a slide 36 preferably made of copper engageable with the underside of the strip 27 and having a vertical hole 37 extending therethrough, which hole may coincide with a similar hole 38 formed through the slide supporting jaw 35. This slide is constantly urged into the position shown in Fig. 1, that is with its hole 37 in offset relation relative to the hole 38, by any suitable means such as a compression spring (not shown). The other jaw 35 also carries a piece of copper or conductor 39 also engageable with the underside of the strip 27.

The upper die 26 is provided with a forming cavity 40 of a shape corresponding to the external configuration of the blank section 15. Laterally on each side of the cavity 40, the lower wall 41 of the die 26 is tapered inwardly as at 42 to facilitate the bending operation about to be described, while the longitudinal ends of this lower wall 41 form laterally extending cutting edges 43 and 44 cooperating with the cutting edges 29 and 30 respectively for partly cutting the strip as will be explained later. The bottom of the cavity 40 is provided with flat end portions 45 and 46 corresponding to the flat lands 21 and 22 of section 15, the outer edges 47 and 48 of which portions also cooperate with the cutting edges 29 and 30 respectively of the lower die for cutting the section 15 from the strip 27.

Movable with the upper die 26, there is a vertical plunger 49 formed with a pointed end 50, which plunger is mounted coaxially with the hole 38 of the jaw 35 and is slidable through the hole 37 of the slide 36.

In practice, the feeding of the strip 27 through the lower die 25 is preferably done by an automatic feeding mechanism of any suitable construction, calculated to intermittently feed the strip a distance somewhat greater than the length of the section 15, thereby allowing the end portion of the strip to extend over the inner end portion of the slide 36 located under the adjacent jaw 34. During the feeding of the strip, the jaws 34 and 35 are held open by any suitable mechanism active on the jaws 35. Immediately after the feeding of the strip, the jaws 34 and 35 are made to close and electric current is automatically and simultaneously applied to the slide 36 and conductor 39, which current will flow through the portion of the strip located between the side blocks 31 and 32 to instantaneously heat that portion of the strip above the thermal critical point of the metal, that is to a temperature calculated to be somewhat higher than the normal temperature at which the section 15 would be heated preparatory to a quenching or tempering operation. Subsequently, the electric current applied to the slide 36 and conductor 39 will automatically be shut off and the upper die 26 be made to contact the lower die 25. In this instance, the plunger 49 which extends beyond the lower wall of the upper die, will move through the hole 37 of the slide 36, and cause this hole to move into coaxial alignment with the hole 38 of the jaw 35, thus resulting in the movement of the slide 36 away from the side block 31 and the consequential stretching of the strip between the guides 33 due to the frictional engagement of the slide 36 with the adjacent end portion of the strip. The portion of the strip thus heated and stretched between the side blocks 31 and 32 is ready to be contacted by the upper die 26.

Figure 3:
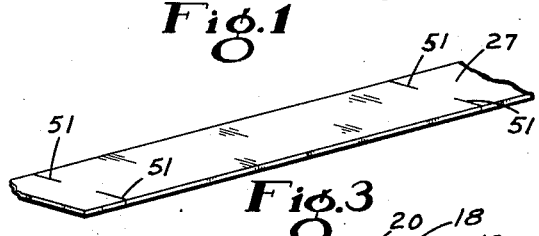
Fig. 3 is a perspective view showing a section of the plate partly severed from the strip.
Figure 5:
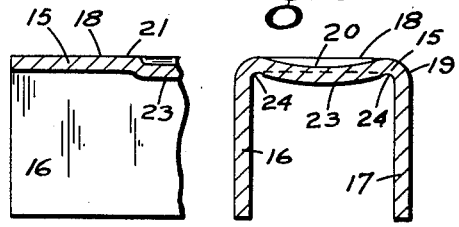
Fig. 5 is an enlarged fragmental longitudinal sectional view taken in a plane indicated by line 5—5 in Fig. 4.
Figure 6:
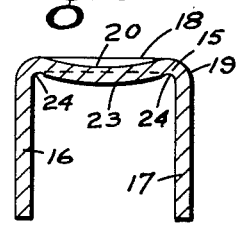
Fig. 6 is an enlarged cross sectional view taken in a plane indicated by line 6—6 in Fig. 4.
Figure 4:
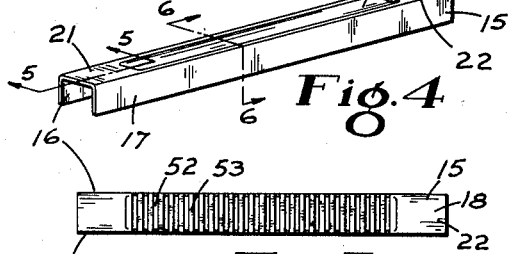
Fig. 4 is a perspective view showing a partly finished section as formed by the die members shown in Figs. 1 and 2.
Figure 7:
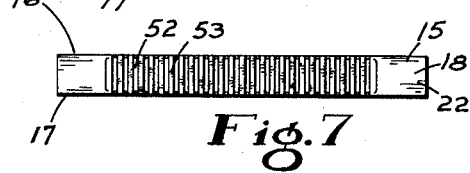
Figures 9, 10:
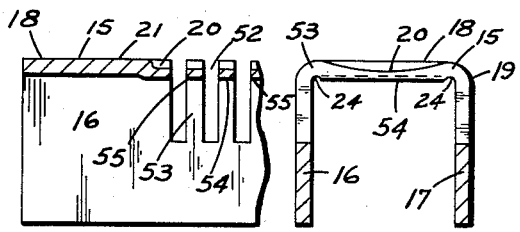
Figure 8:
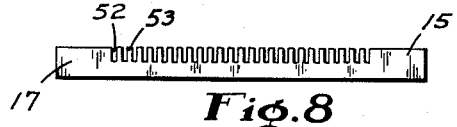
Fig. 8 is a side view of the section shown in Fig. 7.

As the upper die moves downwardly, its shearing edges 43 and 44 coooperating with the shearing edges 29 and 30 of the lower die will cut through the strip at four different places illustrated by lines 51 in Fig. 3, the extent of each cut corresponding to the height of the section's side walls 16 and 17. Subsequently the tapered portion 42 of the lower wall 41 of the upper die, engaging the portions of the strip between the longitudinally spaced cuts 51, will bend these portions at substantially right angles from the yet uncut central portion of the strip corresponding to the upper wall 18 of the section 15. Toward the end of its downward stroke, the upper die cutting edges 47 and 48 cooperating with the cutting edges 29 and 30 of the lower die will entirely sever the now shaped section from the strip. After the shearing and forming operations have been completed, the dies will be made to remain momentarily closed with the formed section 15 clamped between them. Immediately before the final closing of the dies, the blank section somewhat cooled off by the shearing and bending operations will now be at the temperature calculated to produce adequate hardness and toughness of the metal when suddenly cooled off between the dies, which cooling operation is possible due to the thinness of the stock.

After the blank section has been heated, formed and tempered as above described, a series of longitudinally spaced laterally extending slots 52 are cut across the blank to produce a plurality of longitudinally spaced teeth 53 of a width substantially equal to that of the slots, which width is about fifteen thousands of an inch. This cutting operation is preferably performed by mounting on a shaft a plurality of grinding wheels of a width equal to that of the slots, the wheels being longitudinally spaced from each other an extent corresponding to the width of the teeth 53. This gang of wheels rotated at relatively high speed is simply fed across the blank, which blank is preferably secured within a pan-like container and submerged in cooling liquid such as soap water or the like. The relation of the wheels to the blank is such that the slots 52 will extend partway through the side walls 16 and 17 of the blank, while the total width of the gang wheels is calculated to cut slots only through the concaved portion 20 of the blank, leaving the flat end portions 21 and 22 thereof solid to form with the solid lower portions of the side walls 16 and 17 reinforcing lands supporting the teeth 53.

After the grinding of the slots 52, in order to remove any possible burrs resulting from grinding and slight oxidation resulting from the heating of the stock, the section 15 is preferably polished or buffed by applying the section 15 to a rotating buffing wheel made of felt or the like.

Subsequently the semifinished section 15 is turned upside down within the pan-like container, and the now convexed underside 23 of the upper wall 18 is ground perfectly flat as at 54 to form teeth having flat inner surfaces forming with the side walls of the teeth sharp cutting edges 55. This last grinding operation is preferably performed by using a single grinding wheel of a width materially smaller than the inner width of the section 15, rotating the wheel and feeding it longitudinally of the section. Simultaneously the pan-like container within which the section is located is reciprocated transversally of the grinding wheel, the extent of this reciprocatory movement being calculated to bring the inner surfaces of the side walls 16 and 17 alternatively close to the corresponding side walls of the wheel without necessarily being contacted thereby, thus resulting in a criss-cross grinding of the underside 54 of the teeth 53, which type of grinding is known to produce perfectly flat surfaces without necessitating the peripheral wall of the grinding wheel to be maintained perfectly flat. This central portion of the underside 54 thus finished by criss-cross grinding is calculated to be of a width slightly larger than the width of the movable cutter generally included in dry shavers, which cutter is operatively engageable with this ground underside 54 to cooperate with the cutting edges 55 of the teeth 53 for cutting hairs placed therebetween.

Figure 11:
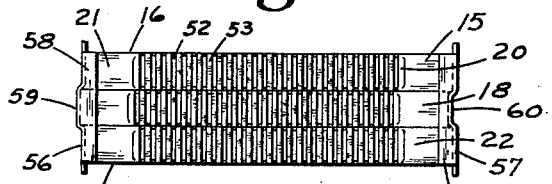
Fig. 11 is a top plan view of a finished plate assembly.
Figure 13:
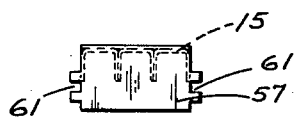
Fig. 13 is an end view of that plate.
Figure 12:
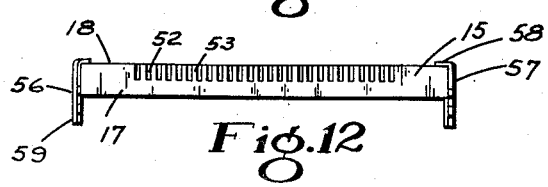

The complete shearing plate is finally produced by mounting several, in this instance three, of the sections 15 side by side as shown in Figs. 11 to 13. This final operation may be performed in several ways to either produce a shearing plate assembly forming a single unit, or by loosely mounting the respective sections of the shearing plate within appropriate brackets or the like provided within and forming a part of the razor head. One preferred construction hereinafter described, is to produce a shearing plate assembly forming a single unit of simple construction and installation. In this instance, the three sections 15 are mounted longitudinally between two platelike brackets 56 and 57, each bracket being of a width equal to the combined width of the sections and having an upper inturned flange 58 bent at right angles and extending over the flat end portions 21 and 22 of the sections 15. Intermediate its lateral ends, the inner surface of the bracket 56 is formed with a shallow recess 59 of a depth equal to the width of either a slot 52 or tooth 53, which slot and tooth are of equal width, and of a configuration adapted to receive one end of one section 15. The inner wall of the bracket 57 is provided with a protuberance 60 corresponding to the recess 59 of the bracket 56. As the three sections are mounted between the brackets 56 and 57, the center section, due to the recess 59 and protuberance 60 formed on the brackets 56 and 57, will be located out of perfect lateral alignment with the ends of the two extreme sections, thereby positioning the sections 15 in a maner whereby the slots 52 of the extreme sections will be staggered relative to the slots of the central section. The amount of stagger being equal to the width of one slot will result in the normally open ends of the slots of the outer sections to be closed by the teeth of the inner section, thus forming a shearing plate assembly having alternate slots and teeth extending laterally partway across the plate with the slots and teeth disposed in a checkerboard-like manner affording a rigid construction capable of resisting any normal pressure resulting from the contact of the shearing plate with the skin intended to be shaved.

After the three sections 15 have been disposed between the two brackets 56 and 57 as above described, they are preferably secured to the brackets by spot welding the inturned flanges 58 to the flat end portions 21 and 22 of the sections, thus resulting in a shearing plate assembly forming a single unit which may be attached within the upper end of the razor by any suitable means such as screws (not shown) engageable with slotted lugs 61 provided on the brackets 56 and 57.

While the foregoing is a specific description of one form which the invention may assume in practice, it will be understood that this form is shown for the purpose of illustration, and that the invention may be modified and embodied in various other forms without departing from the spirit and the scope of the appended claims.

I claim:

1. A method of manufacturing a shearing plate for razors or the like comprising forming from a strip of thin metal sections of said plate of channel shape configuration, slightly caving in the cross wall of each section to produce said wall with a concaved outer and a convexed inner surface, cutting through said cross wall a plurality of longitudinally spaced open ended slots extending laterally thereof, grinding flat the inner surface of said wall, and mounting several of said sections side by side against any appreciable movement relative to one another.

2. A method of manufacturing a shearing plate for razors or the like comprising forming from a strip of thin metal sections of said plate of channel shape configuration, slightly caving the portion of the cross wall of each section intermediate the longitudinal ends thereof to produce said wall with a concaved outer and a convexed inner surface falling short of the longitudinal ends of said section, cutting through the caved portion of said cross wall a plurality of longitudinally spaced open ended slots extending laterally thereof, grinding flat the inner convexed surface of said wall, and mounting several of said sections side by side against any appreciable movement relative to one another.

3. A method of manufacturing a shearing plate for dry shavers or the like comprising forming from a strip of thin metal sections of said plate each including a skin contacting wall, slightly caving said wall to produce a concaved outer and a convexed inner surface, cutting through said wall a plurality of longitudinally spaced open ended slots extending laterally thereof, grinding flat the inner surface of said wall, and mounting several of said sections side by side against any appreciable movement relative to one another.

4. A method of manufacturing a shearing plate for dry shavers or the like comprising bending a flat strip of thin metal to form a blank including a skin contacting wall and at least one supporting wall therefor extending angularly relative thereto, slightly caving said skin contacting wall to produce a concaved outer and convexed inner surface, cutting through said skin contacting wall longitudinally spaced slots extending laterally thereof through said supporting wall, and grinding flat said inner surface.

5. A method of manufacturing a shearing plate for dry shavers or the like comprising forming from a strip of thin metal an elongated blank of substantially U-shaped cross section, slightly caving the cross wall of said blank to produce a concaved outer and a convexed inner surface, cutting through said cross wall a plurality of longitudinally spaced slots extending laterally thereof through at least one side wall of said blank, and grinding flat said inner surface.

6. A method of manufacturing a shearing plate for a dry shaver or the like comprising forming from a strip of thin metal a blank including a substantially rectangular skin contacting wall, caving said wall to a depth smaller than the normal thickness thereof to produce concaved and convexed surfaces extending laterally from one to the other longitudinal border of said wall, cutting through said wall a plurality of longitudinally spaced laterally extending slots, and grinding flat said convexed surface.

WENDELL L. MARTIN.